April 16, 1940.   A. P. SULLIVAN   2,197,370
CALORIMETER
Filed Nov. 7, 1935   4 Sheets-Sheet 2
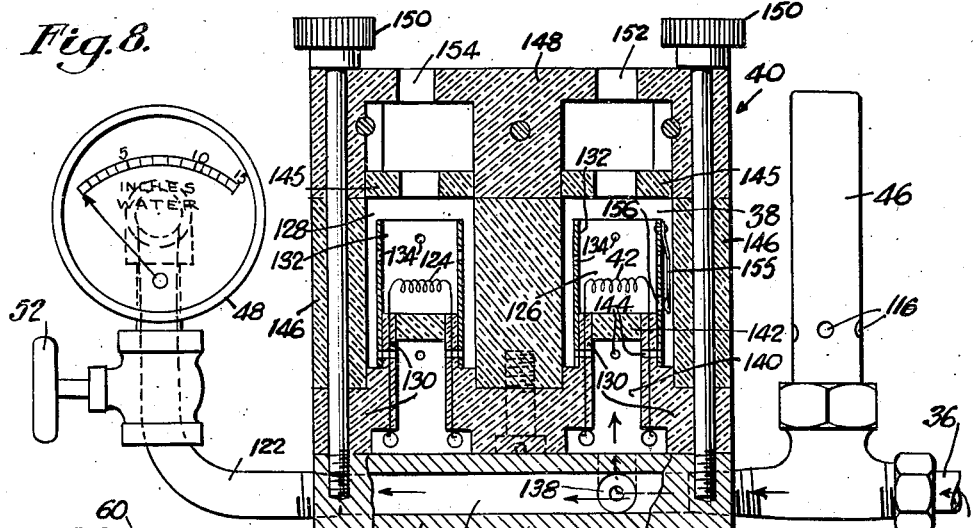
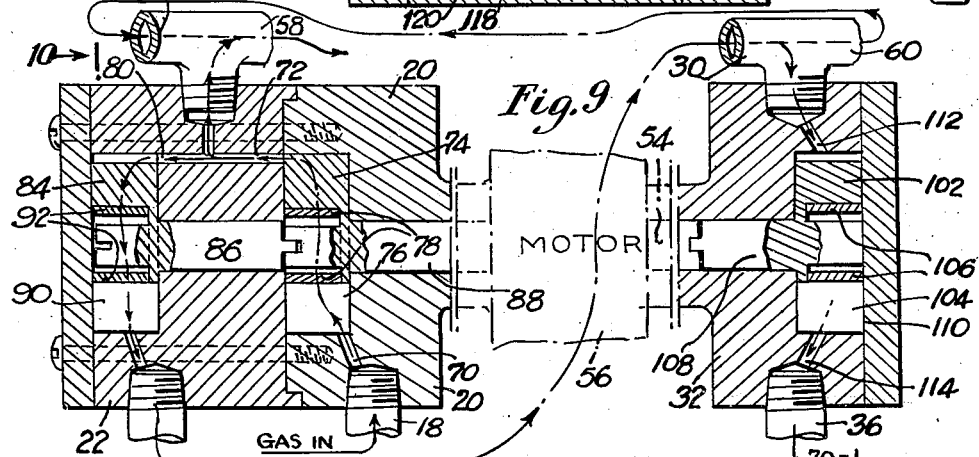
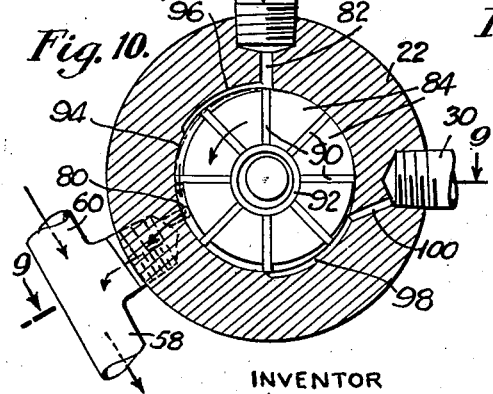
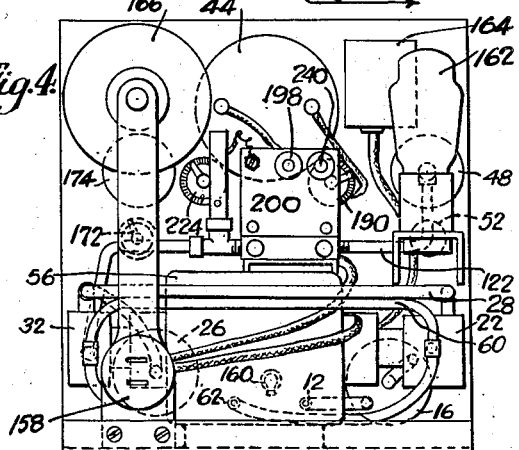
INVENTOR
ALAN P. SULLIVAN
BY *Edmund G. Borden* ATTORNEY April 16, 1940.　　A. P. SULLIVAN　　2,197,370
CALORIMETER
Filed Nov. 7, 1935　　4 Sheets-Sheet 3
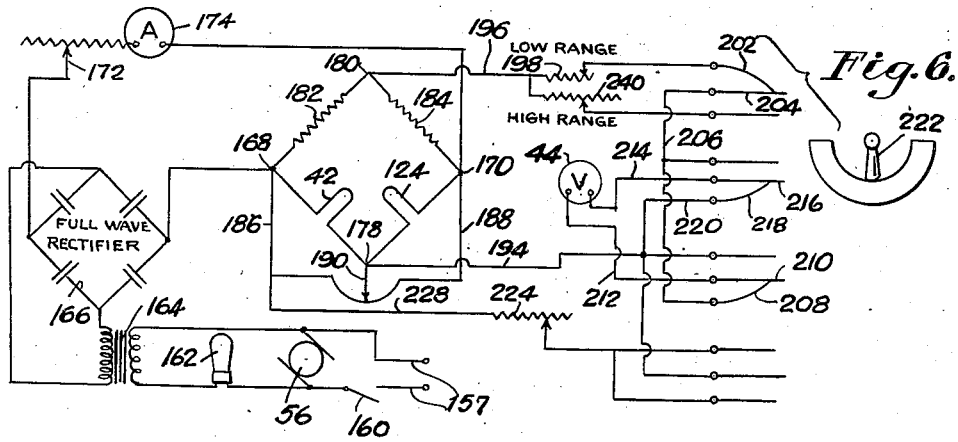
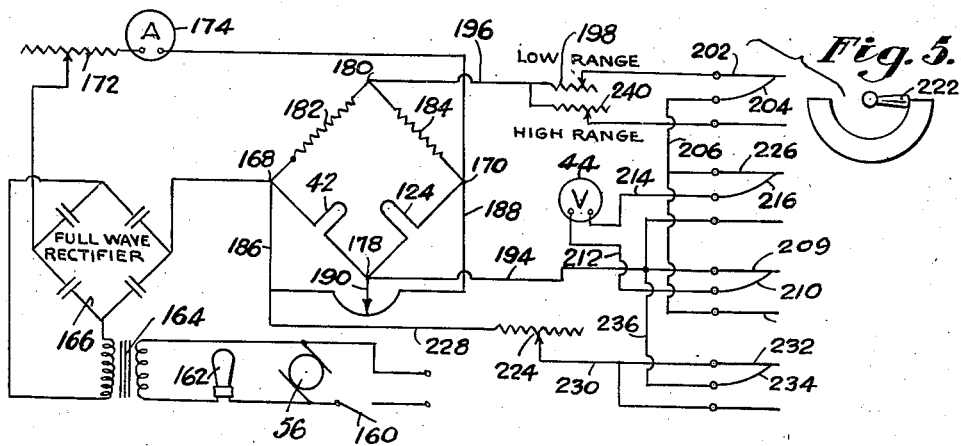
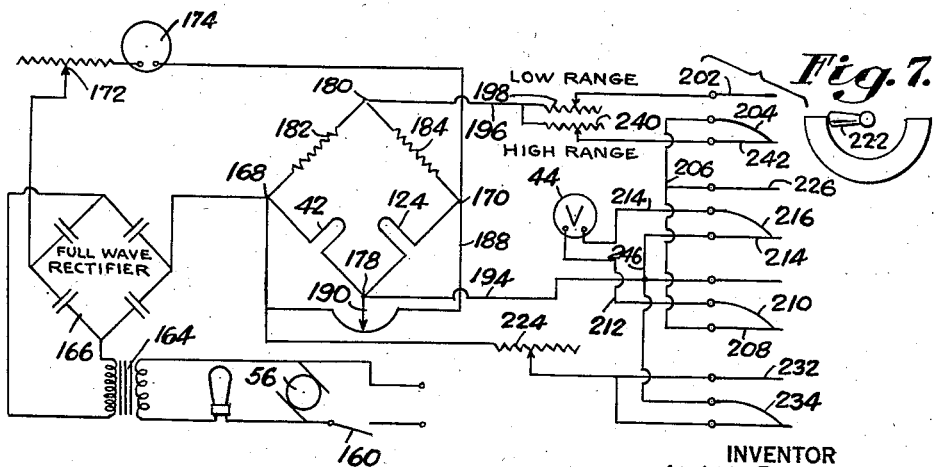
INVENTOR
ALAN P. SULLIVAN Patented Apr. 16, 1940

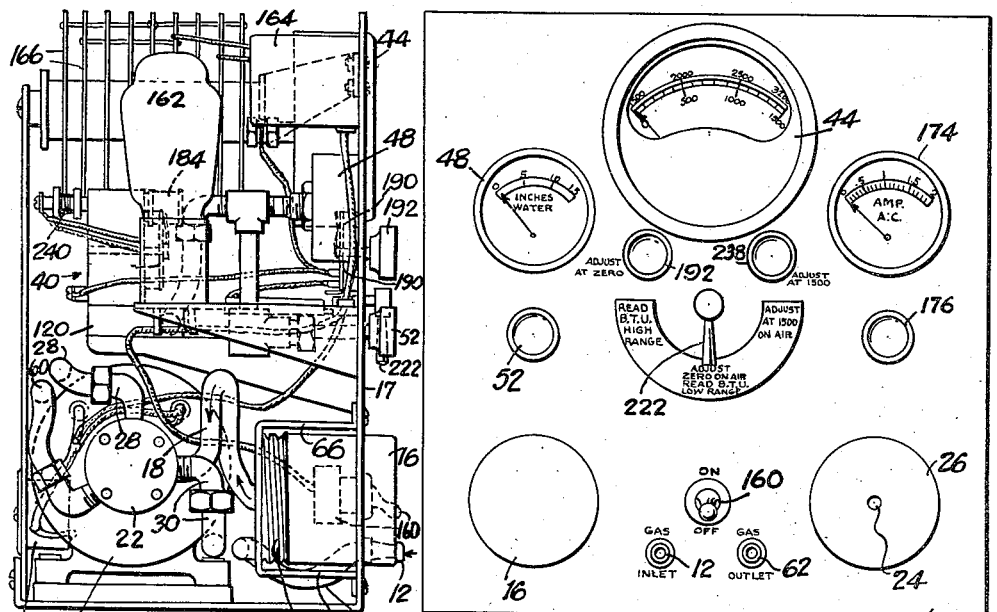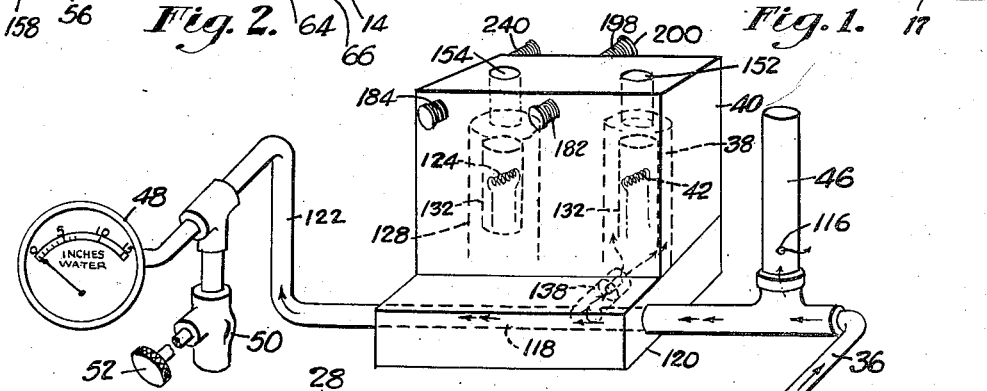

2,197,370

UNITED STATES PATENT OFFICE 2,197,370

CALORIMETER

Alan P. Sullivan, Jackson Heights, N. Y., assignor to Power Patents Company, Hillside, N. J., a corporation of Maine Application November 7, 1935, Serial No. 48,630

3 Claims. (Cl. 73—190)

This invention relates to calorimeters and more particularly to a new and improved gas calorimeter for continuously measuring the heat value of a gas.

One object of the invention is to provide a direct continuous reading calorimeter having a large calorific range.

Another object of the invention is to provide a single calorimeter capable of determining the B. t. u. content of different gases having widely varying heating values and chemical compositions.

A further object of the invention is to provide a simple and compact calorimeter which may be readily utilized by unskilled operators and maintain its calibration and adjustment.

A further object is to provide a continuous indicating calorimeter in which the time lag between the taking of a sample and the indication of the B. t. u. value of the sample is very short, that is, approximately fifteen seconds.

A further object of the invention is to provide a continuous measuring calorimeter which is simple in construction and inexpensive to manufacture.

In the analyzing of the heating values of various gases it is generally necessary to provide a plurality of instruments or meters, each one of which is utilizable as to a particular gas or group of gases having substantially the same heating values. For example, producer gas may vary somewhere in the neighborhood of about 100 to 150 B. t. u. per cubic foot; water gas may vary from about 300 to 350 B. t. u. per cubic foot; coal gas may have in the neighborhood of about 500 to 600 B. t. u. per cubic foot, and butane may have in the neighborhood of 3200 B. t. u. per cubic foot. It is readily apparent that a meter capable of determining the heating value of a gas in the neighborhood of 3200 B. t. u. may be very inaccurate as to the measurement of a gas having heating value in the neighborhood of 100 B. t. u. and if it is a precision instrument it is probably impossible to cover such a large range.

In analyzing the various gases for their heating value it is necessary to construct a calorimeter which is extremely sensitive and which is capable of withstanding the temperatures developed in the combustion of the gas without inaccuracy. To avoid the foregoing difficulties it is preferable to reduce all of the gases being analyzed to a common basis by diluting the gas to be tested with a gas of predetermined properties, for example air. The pressures in a calorimeter and its component parts must be preserved at substantially atmospheric pressure throughout so as to maintain predetermined relations in the mixtures. The catalytic agents must be so designed with respect to the heating elements that they withstand the temperatures of combustion and do not become subject to crystallization or other changes resulting in their lack of stability. The indication of the meter must be accurately proportional to the heating values of the different gases analyzed. The gases usually tested are made up of a mixture of two or more of the following components: H, CO, $CO_2$, N, O and hydrocarbons. The burning characteristics and flame temperatures where burning these different components are different. It is essential, therefore, that when determining the heating value of a gas made of two or more of these components that the true heating value of the mixture will be accurately determined by the calorimeter.

The measurement of the heating value of a gas is made in accordance with the present invention by burning the gas in contact with a catalytic material and measuring the temperature rise resulting from the combustion. In order that this measurement may be a true and accurate measurement of the heating value of the gas it is necessary to completely burn all of the constituents of the gas. Carbon monoxide readily burns completely under favorable conditions but when hydrocarbons are burned it is necessary that the proper combustion temperature must be maintained to obtain complete combustion. For example when methane $CH_4$ and ethane $C_2H_6$ are burned these hydrocarbons are not completely decomposed in $H_2$ and C and burned with $O_2$ to form $H_2O$ and $CO_2$ with a unimolecular reaction if the temperature conditions of the combustion are not within a definite range. If the temperatures are too low secondary reactions set in or partial oxidation reactions of the hydrocarbons occur to form hydrogen-carbon-oxygen compounds such as methanol, formaldehyde, acetaldehyde and aliphatic acids. These compounds in turn may be further decomposed or oxidized by reactions that are both endothermic and exothermic. Such actions and reactions result in a combustion which are not a true representation of the heat value of the gas. When the combustion is conducted without the use of a special catalyst temperatures around 2100° F. are required to obtain a unimolecular reaction. With an active catalyst the desired unimolecular reaction may be carried out when the combustion temperature is in the neighborhood of 1700° F. The catalyst preferably is in the form of a wire and the combustion temperature range is maintained by heating the catalyst wire. When the gas to be tested is brought into contact with the wire, the combustion of the gas is initiated at the wire temperature and the combustion results in a temperature rise above the original temperature of the wire. A comparatively thin layer of gas adjacent the wire is completely burned and it is the combustion of this layer of gas upon which the heat determination is based.

The combustion of hydrogen also presents a problem in that hydrogen has a very high rate of flame propagation. It is important therefore when measuring the heat value of a gas containing hydrogen to carry out the combustion of the hydrogen at temperatures where the effect of the rate of flame propagation will be entirely overcome. It has been found that with the combustion temperature in the neighborhood of 1700° F., when using a good catalyst accurate measurements may be made in analyzing gas containing hydrogen.

The method of making a calorific gas analysis by the present invention consists in accurately measuring the gas to be tested, measuring a predetermined volume of air which is used in burning the gas and mixing the gas and air together, passing the air-gas mixture under a predetermined pressure through an analyzer, burning the mixture in contact with a heated catalytic wire and measuring the rise in temperature of the wire due to the burning of the gas in contact with the wire. The gas and air are measured and mixed by means of high speed pumps which act to quickly draw in a sample of the gas to be tested, mix it and pass it through the analyzer whereby the analysis is quickly completed and the result of the analysis either indicated or recorded immediately upon the completion of the analysis. The gas and air being measured are reduced to the same pressure and temperature and the same conditions of humidity so that the calorific determinations made will indicate directly the B. t. u. value of the gas and no corrections are necessary to reduce the calorific readings to standard conditions of temperature and pressure.

The oxygen used for burning the gas is supplied through air and the measured air-gas mixture contains a great excess of air, that is an amount of air which will supply more than twice the volume of oxygen necessary for burning the gas. The measured gas-air mixture is preferably diluted with air in amount sufficient to lower its calorific value to less than 50 B. t. u. per cubic foot, which may mean admixture of air with the gas in the proportions of 50–80 volumes of air per unit volume of gas. The gas regardless of its calorific value is always diluted with the same volume of air so that no correction is necessary to take care of the dilution of the air-gas mixture. The temperature rise of the catalyst member is indicated by a sensitive voltmeter and electrical connections are provided with resistances whereby gases having a heating value of from 100 to 1500 B. t. u.'s will be indicated on the scale of the voltmeter and when the heating value of the gas rises higher than 1500 B. t. u.'s then resistances can be placed in the electrical circuits whereby the temperature rise of the catalytic wire may measured in determining the calorific values of gas from 1500 to 3200 B. t. u.'s.

The preferred form of the invention is illustrated in the accompanying drawings in which Fig. 1 is a front elevation of a calorimeter incorporating the various features of the present invention;

Fig. 2 is a side elevation of the calorimeter with the casing removed;

Fig. 3 is schematic illustration of the gas flow circuits used in the calorimeter;

Fig. 4 is a rear elevation of the calorimeter with the casing removed;

Figs. 5, 6 and 7 are electrical wiring diagrams illustrating the electrical circuits utilized in making the calorific measurements;

Fig. 8 is a vertical cross section through the gas analyzer;

Fig. 9 is a sectional view of the gas measuring pumps used in the calorimeter, the cross section of the first stage pump being taken on the line 9—9 of Fig. 10;

Fig. 10 is a vertical sectional view of the first stage pump taken on the line 10—10 of Fig. 9

Figure 11:
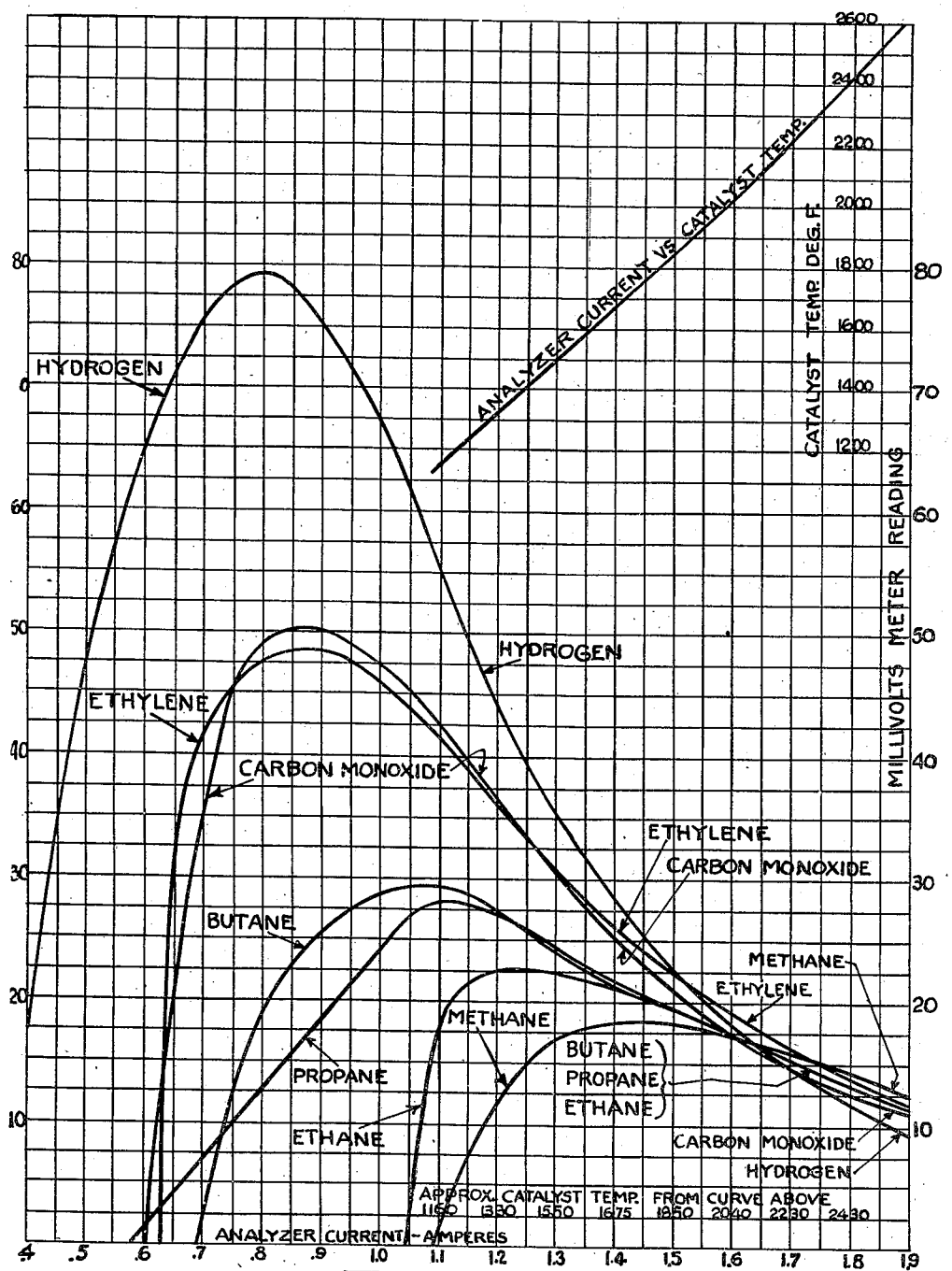
Fig. 11 is a series of curves showing the B. t. u. characteristics of seven different gases as determined with the calorimeter of the present invention.

Referring now to Figs. 1, 2 and 3, particularly the schematic drawing of Fig. 3, the circuits of the gas, air and gas-air mixture for carrying out the calorific analysis may be preferably outlined as follows:

Gas is introduced into the calorimeter through a nozzle 12 and passes through a pipe 14 of a conditioning chamber 16. The nozzle 12 and conditioning chamber are mounted in a front panel 17 of the calorimeter. In the conditioning chamber substantially atmospheric pressure is maintained. The gas is scrubbed with copper shavings and cotton to remove moisture and dust. Furthermore the body of the chamber 16 together with the gas piping is comparatively large so that the temperature of the gas is reduced to atmospheric temperature. From the chamber 16 the gas is drawn through a pipe 18 into a suction pump 20. The pump 20 acts to deliver measured quantities of the gas to be tested under substantially atmospheric pressure. The measured gas passes from the pump 20 into a low stage measuring and mixing pump 22.

The air for mixture with the gas in the pump 22 is drawn into the calorimeter through an opening 24 formed in the front face of a treating chamber 26 which is mounted in the front panel of the calorimeter. The air passing into the chamber 26 is under atmospheric pressure and while passing through the chamber it is reduced to atmospheric temperature. The air in passing through the chamber 26 is scrubbed by means of copper shavings and cotton to remove moisture and any dirt in the air. This treated air is delivered from chamber 26 through a pipe 28 to the pump 22. In the action of the pump 22 a predetermined volume of air is drawn into a pumping chamber along with a predetermined volume of gas. This gas-air mixture composed of about ten volumes of air to one volume of gas is discharged from the pump through an outlet pipe 30. The gas-air mixture in the lower stage pump 22 is delivered by the pipe 30 to a high stage pump 32. The mixture entering the pump 32 through the pipe 30 is further diluted with air that is drawn in from the pipe 28 through a pipe 34, the measuring ratio of the pump 32 being about seven volumes of air to one volume of the air-gas mixture so that the air-gas mixture delivered by the pump 32 has a final ratio of sixty to eighty volumes of air to one volume of gas. This mixture passes through a pipe 36 into a combustion chamber 38 of an analyzer 40. When the air-gas mixture comes into contact with a catalytic wire 42 in the combustion chamber, an additional resistance to the flow of current passing through the wire 42 is set up and this resistance of flow due to the temperature rise of the wire is indicated by a voltmeter 44 mounted near the top of the front panel of the calorimeter Fig. 1. An automatic relief valve 46 is mounted in the line 36 so that the pressure of the gas passing to the analyzer is maintained at a predetermined maximum. The pressure in the line 36 is indicated by a pressure gauge 48 connected to the end of the line 36. This pressure gauge is mounted with the upper portion of the calorimeter panel. The pressure in the line 36 may be controlled by a valve 50 if the relief valve 46 fails to function properly. The valve 50 is mounted on the rear of the calorimeter panel with the valve handle 52 extending through the panel so that it may be adjusted from the front of the panel. Valve 50 may also be used to supplement valve 46 in obtaining the desired pressure.

The pumps 20, 22 and 32 are all directly connected with a driving shaft 54 of a motor 56 so that all of the pumps are driven in unison and at the same speed. This speed is relatively very high and acts to circulate the gas and air-gas mixture through the calorimeter at a high velocity and thus cut down the time lag between the time when the gas sample is taken and the time when the calorific value of the gas is indicated on the voltmeter 44.

In making the calorific gas determination a comparatively small amount of gas is burned by the catalyst wire. The amount of gas handled by the various pumps, however, is very much larger than the amount of gas burned. The excess gas handled by the pump 20 is withdrawn from its discharge port 72 through a tube 58. The excess of air-gas mixture made in the low stage pump 22 is passed out of the calorimeter from the pump through a line 60—58. The high stage pump 32 also pumps a larger volume of air-gas mixture than is desirable to circulate through the analyzer so that the excess of the air-gas mixture passing through the pump 32 is exhausted through a discharge orifice 116 in relief valve 46, and through valve 50. The pipe 58 has a nozzle 62 mounted in the panel of the calorimeter to which a flexible tube may be connected for carrying the exhaust gas away from the calorimeter.

The gas conditioning chamber 16 is shown more particularly in Figures 2, 3 and 4. The chamber is a glass jar which is secured in a threaded cap 64 mounted in a frame 66 attached to the rear of the panel 17. A distributing cylinder 68, Fig. 3, is attached to the cap 64 in a position to surround the outlet pipe 18. The gas inlet pipe 14 is secured to the outer portion of the cap 64 between the outer periphery of the cap and the cylinder 68. The space between the inside of the jar 16 and the cylinder 68 and within the cylinder is filled with filtering and scrubbing material such as cotton or copper shavings so that the gas which enters through the pipe 14 passes back through the jar 16 to the end of cylinder 68 and then through the cylinder out through pipe 18. The gas expands and cools or heats so as to be brought to atmospheric temperature condition in the jar and excess moisture and foreign material is removed in the filter.

The air conditioning chamber 26 is shown more particularly in Figs. 2 and 3. The chamber 26 consists of a glass jar which is threaded into a cap similar to the cap 64 which is attached to the rear of the panel 17. An opening 24 is drilled in the bottom of the jar to admit air and the jar 26 is preferably filled with filtering material such as cotton gauze or copper gauze or both wherein the air is filtered and cleaned before it passes out of the jar into the pipe 28 secured to the center of the cap.

The gas being analyzed for its calorific value is positively drawn into the calorimeter and positively mixed with a measured quantity of air by means of mixing and proportioning pumps. These pumps act continuously to draw in measured quantities of gas and air, mix the gas and air and positively force the mixture through the analyzing cell. The calorimeter is adapted for measuring the calorific value of gas over a scale varying from 100 B. t. u.'s per cubic foot to 3200 B. t. u.'s per cubic foot. In order to determine the calorific value of a high calorific value gas it is necessary to supply a very large volume of air to secure complete combustion of the gas. The problem of continuously taking measured quantities of air and gas and continuously forcing a sample of the gas through the analyzer requires two pumps or a multistage pump. In the present invention two pumps are used for proportioning the air and gas and a third pump is used for the purpose of collecting the gas sample from the source of supply. The pumps are all operated by the single motor 56, the shaft of which is operatively connected to the pumps. The construction and arrangement of the pumps is shown more particularly in Figs. 2, 3, 9 and 10. The gas which is cleaned in chamber 16 is conducted through pipe 18, Figs. 3 and 9, to pump 20. The pump 20 is a rotary pump, the gas being drawn in through an inlet port 70 and discharged through an exhaust port 72, Fig. 9. The details of construction of the pump 20 as well as the pumps 22 and 32 is not claimed herein and only a sufficient illustration is given to show the principle of operation of the pumps. The pump consists of a rotor 74 which is eccentrically mounted in a chamber in the main block of the pump. A series of four vanes 76 are slidably mounted through the rotor, these vanes bearing on one edge against a cylindrical bushing 78 and upon the other edge against the wall of the block of the pump 20. The mounting of the vanes in the pump is illustrated in Fig. 10, except that Fig. 10 shows a cross section of pump 22 wherein eight vanes are used in place of the four vanes which are used in pump 20. The gas entering between the rotor and the wall of the pump cylinder is carried by means of the vanes 76 from the inlet port to the exhaust port where it is all discharged, this pumping action being positive, unidirectional and continuous.

The gas issuing from the outlet port 72 of pump 20 is delivered to an inlet port 80 of pump 22, Figs. 9 and 10. In advance of the port 80 in the direction of rotation of the pump is an air inlet port 82 which connects with the air inlet pipe 28. A rotor 84 is mounted within the block of the pump 22, this rotor being integral with a shaft 86, Fig. 9, which has a universal connection with a shaft 88 of the rotor from pump 20. The shaft 88 in turn is integral with the shaft 54 of the motor 56. Eight vanes 90 are slidably mounted within the rotor 84, these vanes being mounted between a cylindrical bushing 92 and the cylindrical chamber 94 of the block of the pump 22. The shaft 86 and rotor 84 are mounted eccentrically to the chamber 94 of the pump 22. The direction of rotation of the shaft 86 is indicated in an arrow in Fig. 10 and it will be apparent that as the rotor and vanes 90 pass the port 82, a charge of air is drawn into the compartment between two adjacent vanes. The intake of air continues from the port 82 throughout the extent of a circular port 96 formed in the wall of the chamber 94. When the vane passes the end of the port 96 the air intake will cease. After the chamber or compartment which is formed between two adjacent vanes the rotor 84 and the wall of chamber 94, has taken a charge of air it will move around to a position in communication with the port 80 and while the compartment is moving across the port gas will be drawn into the chamber. The arrangement of the ports 80 and 96 and size and shape of the ports is such that the proportion of air to gas drawn into the pumping compartment is about 10 volumes of air to one volume of gas. The drawing in of the gas into the air tends to mix the two components and as the rotor continues to rotate it comes opposite port 98 where the mixture starts to discharge, the mixture passing through the port 98 out through a port 100 to the mixer pipe 30, Fig. 3. At the position of the outlet port 100 the rotor and wall 94 of the pumping chamber come together so that all of the mixture is discharged into the outlet port. The pumping compartment is closed from the outlet port 100 until a vane used in forming the compartment goes past the inlet port 82.

The construction of the pump 32 is substantially the same as the construction of pump 22. This pump consists of a rotor 102, a series of eight vanes 104 and a cylindrical bushing 106. The rotor is integral with a shaft 108 which has a universal connection with the shaft 54 of the motor 56. The rotor 102 is eccentrically mounted within a chamber 110 of the pump, the pumping action consisting in drawing in the mixture of gas and air from the line 30 through an inlet port 112 and forcing out a mixture of gas and air through an outlet port 114 to the pipe 36. Before the pumping compartment of the rotor and vanes passes the inlet port 112 it has previously passed an inlet port communicating with the air line 34, Fig. 3 and a charge of air has been taken into the compartment. When this compartment passes the port 112 a charge of airgas mixture is drawn in. Then the air-gas mixture is carried to the exhaust port 114. The arrangement of the inlet ports in the pump block is such that the volume of air drawn into the compartment is seven times the volume of the air-gas mixture drawn into the compartment during one revolution of the rotor. Therefore the mixture forced out of the exhaust port 114 consists of sixty to eighty volumes of air to one volume of gas.

The motor 56 is preferably operated at a comparatively high speed in order to develop a high velocity of circulation of the gas and air through the pumps. The object of this high velocity of circulation is to provide a minimum of time between the time when the air is drawn into the inlet port 12 and the gas passes from the pump into the analyzer 40. The volume of gas required for the analysis is comparatively small and in order to avoid errors due to mechanical limitations the volume of gas being actually pumped and handled by the pump is many times that volume which is required for the analysis. Accordingly a large portion of the gas drawn into the system through the pump 20 is forced out through the line 58 to the gas outlet. Likewise a large portion of the air-gas mixture delivered from the pump 22 to the line 30 passes through the line 60 to the exhaust pipe 58.

The gas and air introduced into the pumps are maintained at substantially atmospheric pressure and the air-gas mixture delivered by the pumps to the analyzer is delivered at a substantially uniform pressure. In order to avoid error of measurement a pressure regulator is placed in the line by which the gas is delivered to the analyzer to insure that a uniform pressure is maintained in the gas flowing into and through the analyzer. The pressure regulator is shown more particularly at 46 in Figs. 3, 4 and 8. 46 is an ordinary ball regulating valve wherein a ball of predetermined weight is mounted on a seat and if the pressure of the gas exceeds the predetermined desired pressure gas will escape past the ball and will exhaust to the atmosphere through ports 116 in the valve. Valve 46 is connected between the pipe 36 and a passage 118 formed in the base 120 of the analyzing unit. A pipe 122 connects the passage 118 with the pressure gauge 48, Figs. 1 and 8, by which the pressure of the gas being delivered to the analyzer is indicated on the panel 17. If the amount of gas being delivered by the pump 32 is in excess of the amount needed for analysis and tends to build up a pressure higher than that which can be normally taken care of by the regulating valve 46, this excess gas-air mixture may be removed from the pipe 122 through the needle valve 50.

The gas analyzing unit is shown more particularly in Figs. 3, 4, and 8. The analyzer is made up of two units, the gas burning unit 42 in combustion chamber 38 and a comparator unit 124. The units 42 and 124 are made up of a platinum catalyst wire in the form of an elliptical coil. Each of the coils has six turns and the turns of wire are spaced apart substantially the diameter of the wire. The coils are positioned in thermally insulated chambers which are arranged so that the coils are constantly in touch with a changing flow of gas and will be affected as the composition of the gas changes by a catalytic combustion of the gas in a comparatively thin film surrounding the winding of the coil. The coils 42 and 124 are mounted in chambers 126 and 128 respectively, each coil being electrically insulated and mounted on a base 130 formed of an electrical and thermal insulator composition composed of a phenol aldehyde condensation product. Each coil is surrounded by a cylindrical shield 132, the shield being perforated by a series of openings 134 by which gas flowing around the shield diffuses and passes into the interior of the shield and into contact with the coils. The coil 42 is an active combustion coil wherein gas is burned in contact with the coil.

Only air circulates through chamber 128 so that no combustion takes place around the coil 124. The gas for combustion in the chamber 126 is introduced through a duct 138, Figs. 3 and 8, which opens into a chamber 140 formed in the base 130. The upper end of the chamber is closed by a plug 142 and immediately below the plug are located a series of openings 144. The openings 144 communicate with the chamber 126 at the outside of the shield 132. By having a uniform pressure on the gas passing through the orifice openings 144 the gas will always flow at a uniform velocity through the chamber 126. The gas to be tested therefore passes upwardly through the opening 144 in the chamber 140 and flows through the openings 144 into the combustion chamber 38. As the gas passes upwardly around the shield 132, part of the gas flows through the openings 134 to come into contact with the catalytic coil 42. A partition 145 is mounted in each of the chambers 38 and 128 immediately above the shields 132 for the purpose of controlling the circulation of gas and air through the chambers. The chambers 126 and 128 are formed in a phenol aldehyde condensation product block 146 which is mounted upon the block 130. The block 146 may however be made of metal. Immediately above the block 146 is mounted a cover block 148, these blocks being assembled and connected to the base 120 by means of cap screws 150. An opening 152 is formed in the block 148 above the chamber 126 by which the unburned gas and products of combustion may escape from the analyzer block. An opening 154 is formed in the block 148 above the chamber 128 by which the air circulation through the chamber 128 may be provided.

In operation of the analyzer it has been found that the flow of gas through the analyzing cell varies as the temperature of the cell varies. For example it has been found that when the voltmeter 44 has been calibrated to a zero position when air is circulated through the analyzer cell with the cell comparatively cold, then when the catalyst wire and cell are heated the characteristics of flow of the gas varies and the zero position of the needle varies. Accordingly a thermostatic valve is used to control the flow of gas through the shield 132. To accomplish this a valve consisting of a thermostatic bi-metallic strip 155 is attached to the side of the shield 132 and arranged to close an opening 156 in the shield. When the shield is cold or cool the thermostatic valve tends to close the opening 156. As the temperature of the gas and the shield increases the thermostatic valve tends to allow gas to flow through the opening 156 to come into direct contact with the catalytic coil 42. The thermostatic valve acts as a throttle valve for increasing and decreasing the flow of gas through the opening 156. By this means the calibration of the catalytic coil and voltmeter may be established and the analyzer unit brought into a stabilized operating condition in a comparatively short period of time.

The coils 42 and 124 are connected in an electrical circuit and are electrically heated by the circulation of an electrical current therethrough. These coils form two arms of a Wheatstone bridge arrangement for determining the temperature change of the coil. The electrical circuit for heating and measuring the current flow in the coils 42 and 124 will be described hereinafter.

The electrical heating, measuring and switching circuits used in the calorimeter are illustrated more particularly in Figs. 5, 6, and 7. The calorimeter is adapted to be operated on the usual alternating current power circuit. This power circuit is illustrated by the leads 157 which are shown as being applied to a plug 158 mounted on the rear of the panel 17, see Fig. 4. From the plug 158 the power passes in series through a toggle switch 160, Figs. 1, 2 and 4. The main circuit leads from the switch are connected across the brushes of the motor 56 and also from these leads is taken the electrical power for heating the catalyst elements or coils 42 and 124 of the catalyst bridge. The voltage of the current used for heating the temperature measurement catalyst bridge is preferably reduced by means of a transformer to approximately a uniform value of five to six volts. To accomplish this the current flows through a ballast or constant current flow lamp 162, Figs. 2 and 4, to the high voltage side of a transformer 164, Figs. 2 and 4. From the low voltage coil of the transformer the current flows to the primary side of a full wave rectifier 166 which is in the form of a bridge, the rectifier being illustrated in Figs. 2 and 4. The rectified current is taken from secondary points on the rectifier which are connected to points 168 and 170 of a Wheatstone bridge. The current flowing to the Wheatstone bridge passes through a rheostat 172 and an ammeter 174, the rheostat and ammeter being illustrated in Figs. 1, 2 and 4. A handle or knob 176 for operating the rheostat 172 is illustrated on the panel 17 in Fig. 1, the ammeter face showing on the front side of the panel. The rheostat 172 is used for controlling a uniform current supply to flow through the arms of the Wheatstone bridge. Between the point 170 of the Wheatstone bridge and a point 178 forming another point of the bridge is connected the comparator coil 124. Between the point 178 and the point 168 of the bridge is mounted the combustion coil 42. Between the point 168 of the bridge and a fourth point 180 is mounted a fixed resistance 182, and between the points 180 and 170 of the bridge is mounted a second fixed resistance 184. The resistances 182 and 184 are mounted on spools secured to the analyzer block 146, see Figs. 3 and 8. The resistances 182 and 184 are adjustable whereby the Wheatstone bridge may be balanced. When these resistances are fixed there is no further need for modification. When the resistances of the coils 42 and 124 are proportional to the resistances 182 and 184 then the Wheatstone bridge is balanced and there will be no current flowing across the points 178 and 180. If, however, the coil 42 is heated so that the current flow through the arm of the bridge is different from the current flow through the coil 124 then there will be a current flow between the points 178 and 180. The measure of this current flow is used for determining the temperature rise caused by the combustion of gas in contact with the coil 42. This current flow is indicated on the voltmeter 44 mounted on the panel 17. The voltmeter is connected with the points 178 and 180 of the Wheatstone bridge through a 4-pole, 3-position switch that will be hereinafter described.

After the fixed resistances 182 and 184 have been fixed it is possible that the resistances of the analyzer coils 42 and 124 may vary from time to time and need further adjustment. To provide for this a resistance is provided so that the resistances of the coils 42 and 124 may be readily adjusted at any time. To accomplish this an adjustable shunt is arranged between the Wheatstone bridge points 168, 178 and 170. This is accomplished by means of leads 186 and 188 which are connected with an adjustable resistance member 190 which is a rheostat mounted on the rear of the panel 17 (see Fig. 4) and having a knob 192 extending through the front of the panel Fig. 1. The resistance 190 is connected with the point 178 of the Wheatstone bridge. A slight adjustment of this shunt resistance acts for equalizing the resistance of the coils 42 and 124 in the bridge.

The determination of the calorific value of a sample of gas depends upon the temperature rise effected by the combustion of the gas in contact with the catalytic coil 42, this temperature rise being measured by a change in current flow through the arms of the Wheatstone bridge and this change being measured on the voltmeter 44. The chart in the voltmeter may be calibrated in terms of B. t. u. value of the gas and it is apparent that the graduations will be more accurate in accordance with the number of B. t. u.'s represented by each graduation on the scale. Since the calorimeter is arranged to cover such a wide scale of heat values, that is 100 B. t. u.'s to 3200 B. t. u.'s, an arrangement is made whereby a movement of the pointer across the dial will indicate from zero to 1500 B. t. u.'s on the lower scale and then by manipulation of the 4-pole switch the pointer is brought back to the zero position of 1500 B. t. u. and moves from 1500 to 3200 on the upper scale. By this means therefore the single voltmeter is used to indicate over a scale double the length of the normal swing of the pointer. A separate resistance is used in the voltmeter circuit for measuring the heat determinations on each scale of the voltmeter.

When the B. t. u. analysis comes within the range of the lower scale the catalytic coil will be heated by the combustion of the test sample to swing the pointer from zero up to 1500 B. t. u.'s. In order to use the upper scale for determining B. t. u. value between 1500 B. t. u.'s and 3200 B. t. u.'s it is necessary to put a proper resistance in the bridge circuit to arrange so that the catalytic coil 42 will be sufficiently cooled to bring the pointer to read correctly with graduations on the upper scale. Then the determination of the gases between 1500 B. t. u.'s and 3200 B. t. u.'s will be indicated by the movement of the pointer with reference to the upper scale. The adjustment of the instrument for using the upper scale consists in reversing the current flow through the voltmeter so that the needle will tend to move in the opposite direction from its normal movement and the needle is brought to 1500 on the lower scale by means of a shunt resistance. Then the current is reversed and the needle will move to a position below or to the left of the 1500 B. t. u. indication on the upper scale, Fig. 1, until the gas being analyzed has a value of 1500 B. t. u.'s or greater. Then as the analysis of gas having a B. t. u. value greater than 1500 B. t. u.'s per cubic foot is made the pointer will swing to the right (Fig. 1) on the upper scale and indicate the proper B. t. u. value. It will be understood that the polarity of the current through the voltmeter is reversed only during the adjusting operation from that which prevails during the heat value determination.

The control of the electrical circuits for using the two scales on the voltmeter and for balancing the instrument is accomplished by means of a 3-way, 4-pole switch, the wire connections of the switch with the electrical circuit being illustrated more particularly in Figs. 5, 6, and 7. In Fig. 6 is shown the setting of the switch and the wiring connections for adjusting the zero setting of the voltmeter and for taking readings on the lower scale. The current flow from the Wheatstone bridge is taken from the points 178 and 180 through leads 194 and 196 respectively. The current flow through the lead 196 passes through a low range resistance 198 which may be adjusted in order to calibrate the low range scale of the voltmeter. After this adjustment of the resistance is fixed the resistance needs no further adjustment. A spool 200 carrying the resistance 198 is shown in Fig. 4. From the resistance 198 the current flows through an arm 202 of a 3-way switch to a central arm 204 of the 3-way switch. From the arm 204 the current flows through a lead 206 to an arm 208 of another 3-way switch, the arm 208 connecting with the arm 210 constituting the central pole of a 3-way switch. From the arm 210 the current flows through a lead 212 to a voltmeter 44. From the voltmeter 44 the current flows through a lead 214 to a central arm 216 of a third 3-way switch, the arm 216 making connection with an arm 218 of the same 3-way switch. From the arm 218 a lead 220 connects with the lead 194 connected to the point 178 on the Wheatstone bridge. With these connections the rheostat 190 is used for balancing the Wheatstone bridge and the resistance 198 is adjusted to calibrate the voltmeter for reading on the lower scale.

In Fig. 5 is illustrated the position of the 4-pole 3-way switch and the electrical connections for balancing the voltmeter 44 for use of the high range B. t. u. determination on the upper scale of the voltmeter. It will be noted that the operating lever of the 3-way switch illustrated at 222 is in a position pointing to the right, Fig. 1, which has the designation "adjust at 1500 on air." When the switch is in this position an auxiliary resistance 224 is thrown in shunt across the arm of the bridge between the points 168 and 178. This extra resistance acts to cool the coil 42 to such an extent that if the needle would operate in its normal path of operation it would move to the left of the zero point on the lower scale. Since it is not practicable to have the needle swing over a larger scale the adjustment of the needle is accomplished by reversing the current and making the adjustment of the needle at the 1500 point on the lower scale which will set the needle at its so-called zero point for reading on the upper scale. To bring the needle to the zero point at 1500 on the lower scale the current is reversed and the needle therefore swings to the right, Fig. 1, over the full length of the scale from zero to the 1500 point. At this time the current flows from the point 178 through lead 194, arms 209 and 210 and lead 212 to the voltmeter 44. From the voltmeter the current flows through the lead 214 to arms 216 and 226 to lead 206 then through arms 204 and 202 to resistance 198 and thence through lead 196 to the point 180. At the same time current from the point 168 in the Wheatstone bridge, passes through lead 186 to a lead 228 connected with the resistance 224. From the resistance the current flows through a lead 230 to an arm 232 on a 3-way switch through a central arm 234 on the 3-way switch to a lead 236 connected with the lead 194. This circuit therefore puts the resistance 224 in shunt across the points 168 and 178 of the Wheatstone bridge and tends to cool the coil 42 to effect the movement of the needle of the voltmeter. The resistance 224, shown in Fig. 4, is provided with an adjusting knob 238, see Fig. 1, by which the resistance in the line may be varied in order to bring the needle to the zero setting at the 1500 point on the lower scale. After this adjustment has been made, then the apparatus is in suitable adjustment for making readings on the upper or high B. t. u. scale.

The setting of the 4-pole 3-way switch and the wiring connections for making readings on the upper or high B. t. u. scale is shown more particularly in Fig. 7. In this setting the lever 222 of the switch is swung to the left, Figs. 1 and 7, as indicated on the front panel 17. At this time current flows from the point 180 on the Wheatstone bridge through lead 196 to a high range resistance 240. The spool on which the resistance 240 is wound is shown as mounted upon the back of the analyzer element, Fig. 4. Current then flows from the resistance through an arm 242 in the 3-way switch to an arm 204 in this switch, then through lead 206 to arm 208 of a 3-way switch, thence through arm 210 and lead 212 to voltmeter 44. From voltmeter 44 the current flows through the lead 214 to arm 216, thence through arm 244 through lead 246 to lead 194 connecting the point 178 on the Wheatstone bridge.

It will be understood that the 3-way 4-pole switch is provided for giving the necessary connections between the Wheatstone bridge and the voltmeter together with its adjusting rheostats. When the operating lever 222 is moved to different positions all four poles of the switch are simultaneously operated to bring the various positions of the switch for the desired connections.

In the combustion of gases, particularly high B. t. u. gases which are hydrocarbons, it has been found essential in order to completely burn the gases and form primary combustion products that the combustion should take place at high temperatures. Otherwise intermediate products are formed. Furthermore the various physical properties of the combustion of gases bear a strong influence on the nature of the combustion of the gases if the combustion takes place at lower temperatures and these phenomena interfere with an accurate measurement of the B. t. u. value of gases. In Fig. 11 is illustrated a series of curves developed by use of the calorimeter illustrated in the drawings to show the effects of the combustion of gases at different temperatures. Seven different curves are illustrated in Fig. 11 for showing the combustion of the following gases: hydrogen, ethylene, carbon monoxide, butane, propane, ethane and methane. These gases were used in their pure form and diluted with air until the various mixtures of each of the gases gave a final B. t. u. value of 150 B. t. u.'s per cubic foot. The catalytic wire for combustion was then heated to different temperatures by means of the use of currents of different strength, the wire temperatures for different current flows having previously been determined, and the B. t. u. reading of the combustion of the gas was then determined.

In Fig. 11, the ordinals represent the current flow or temperatures of the combustion and the abscissae represent the B. t. u. value which is measured as a millivoltmeter reading. From these curves it is very striking how the B. t. u. value of the gases varies as the combustion takes place at different temperatures. Still all these curves merge and give a substantially uniform B. t. u. reading when the temperature of combustion is brought into the range between 1600° and 2200° F. All of these gases for example should give the same B. t. u. reading but it has been proven by many determinations that these individual gases will not give the same B. t. u. reading unless the combustion takes place at a sufficiently high temperature. In the curves illustrated in the drawings it is apparent that at temperatures around 1850° to 2000° F. the temperature readings practically coincide and are within the experimental error. There is, of course, a limitation on the temperature which may be employed because the continuous working of the instrument and the best calibration requires that moderate temperatures be employed. It might be explained furthermore, that although the curves tend to go down in the higher temperature ranges this does not mean that the B. t. u. value is not accurate but only shows that a different calibration or chart is required for the different temperature ranges. The important showing of the curves, however, is illustrated in that the true determination of all of the different types of gases may be brought into coincidence when the combustion takes place at the proper temperatures.

Experience has proven, furthermore, that the nature of the catalyst used for combustion is important in that it is desirable to secure the maximum temperature rise in the coil when the gas is burned. The use of a coil for a catalytic combustion measuring device is very advantageous in that it allows larger and more sturdy wire to be employed and the coils being mounted closely adjacent to one another tend to heat each other whereby the desired temperature of the coil may be reached with a minimum of current flow. By providing a properly constructed coil the combustion of a small amount of gas will give a large temperature rise of the catalyst and the sensitivity of the instrument is increased and the error is minimized.

It has been found that the instrument should be preferably brought into a stabilized heat condition before starting to make heat determinations. After the instrument has once been stabilized continuous determinations can be made on gases varying over a wide degree of heat values and the determination of the gas quickly and continuously made. The short time elapse between the time when the gas enters the instrument until the determination is made is very important, particularly when the calorimeter is used as a control apparatus in chemical and gas making operations and gas reforming operations.

The preferred form of the invention having been thus described what is claimed as new is:

1. A method of determining the calorific value of combustible gas comprising mixing the gas and air in measured quantities, continuously passing the gas-air mixture into contact with a heated catalyst to burn the gas, electrically heating said catalyst by a uniform energy input corresponding to that producing in the catalyst a uniform temperature in the range 1600–2200° F. when the same is immersed in air, regulating the pressure of the gas-air mixture flowing into contact with the catalyst to maintain a uniform velocity of flow of the gas, controlling the path of flow of the gas in contact with the catalyst in accordance with the temperature of the catalyst, and measuring the temperature rise resulting from the combustion of gas surrounding the catalyst.

2. In a gas calorimeter, a gas analyzer comprising a combustion cell and a comparitor cell both disposed with vertical axes and both open to atmosphere at the top, a gas inlet at the base of the combustion cell, a pair of electrical resistance wires connected in series and mounted respectively in the combustion cell and in the comparitor cell, each of said wires comprising a coil of closely spaced loops of high temperature resistant metal, a cylindrical shield in each cell surrounding the coil, there being apertures in each shield located in a plane above that of the coil, there being an aperture in the shield surrounding the coil in the combustion cell in a plane below the plane of the coil, said apertures permitting circulation of gas from said cell in contact with the coil, and a thermostat control closure for the lower aperture in the shield of the combustion cell for controlling the circulation of gas around the coil therein.

3. In a gas calorimeter, a vertical combustion cell having a gas inlet at its base and an outlet at its top, an electrical ignition coil mounted in said combustion cell and having a plurality of closely spaced loops of high temperature resistant wire, a cylindrical shield supported in said cell surrounding the coil, there being apertures in said shield both above and below the coil for permitting circulation of gas from said cell through the apertures into contact with the coil, and a thermostat controlled closure for the lower one of said apertures for controlling the circulation of gas around the coil.

ALAN P. SULLIVAN.